United States Patent
Mogi et al.

[19]

[11] Patent Number: 5,959,192
[45] Date of Patent: Sep. 28, 1999

[54] KNOCK DETECTING DEVICE FOR INTERNAL COMBUSTION ENGINE

[75] Inventors: Kazuhisa Mogi; Koichi Nakata, both of Susono; Yasuo Ito, Nagoya, all of Japan

[73] Assignees: Toyota Jidosha Kabushiki Kaisha, Aichi-Ken; Denso Corporation, Aichi-Pref, both of Japan

[21] Appl. No.: 09/066,176

[22] Filed: Apr. 24, 1998

[30] Foreign Application Priority Data

Apr. 28, 1997 [JP] Japan .................................... 9-111368

[51] Int. Cl.⁶ ................................................ G01M 15/00
[52] U.S. Cl. ........................ 73/35.08; 73/35.07; 73/115
[58] Field of Search ................................ 73/35.01, 35.07, 73/35.08, 115, 116; 324/402, 378

[56] References Cited

U.S. PATENT DOCUMENTS

| | | | |
|---|---|---|---|
| 4,232,545 | 11/1980 | Dobler | 73/35.08 |
| 4,444,172 | 4/1984 | Sellmaier et al. | |
| 4,648,367 | 3/1987 | Gillbrand et al. | |
| 5,675,072 | 10/1997 | Yasuda | 73/35.08 |

FOREIGN PATENT DOCUMENTS

| | | |
|---|---|---|
| 61-57830 | 3/1986 | Japan . |
| 7-243346 | 9/1995 | Japan . |
| 8-261129 | 10/1996 | Japan . |

OTHER PUBLICATIONS

Automotive Engineering, Sep., 1995, "Ion–gap Sensing for Engine Control".
U.S. application No. 08/932,599, Aoki, filed Sep. 17, 1997.
U.S. application No. 08/923,744, Aoki, filed Sep. 2, 1997.
U.S. application No. 08/923,163, Aoki, filed Sep. 4, 1997.
U.S. application No. 08/918,384, Aoki, filed Aug. 26, 1997.

*Primary Examiner*—Christine K. Oda
*Attorney, Agent, or Firm*—Kenyon & Kenyon

[57] ABSTRACT

A knock detection device for an internal combustion engine prevents erroneous knock detection decisions from being made due to an LC resonant current in an ion current path. An LC resonance frequency, which is determined based on an inductance of ignition coil secondary and a stray capacitance formed in the ion current path, is set so as to be displaced from a knock frequency so that the knock frequency component alone can be detected accurately from the ion current output. Preferably, the inductance of the ignition coil secondary is set to a large value, thereby setting the LC resonance frequency lower than the knock frequency and thus improving ignitability as well as knock detectability. Also preferably, the LC resonance frequency is set to a value lower than a lower cut-off frequency of a knock signal extraction band-pass filter provided in a processing circuit. This ensures more reliable elimination of the noise causing LC resonance frequency component.

2 Claims, 6 Drawing Sheets

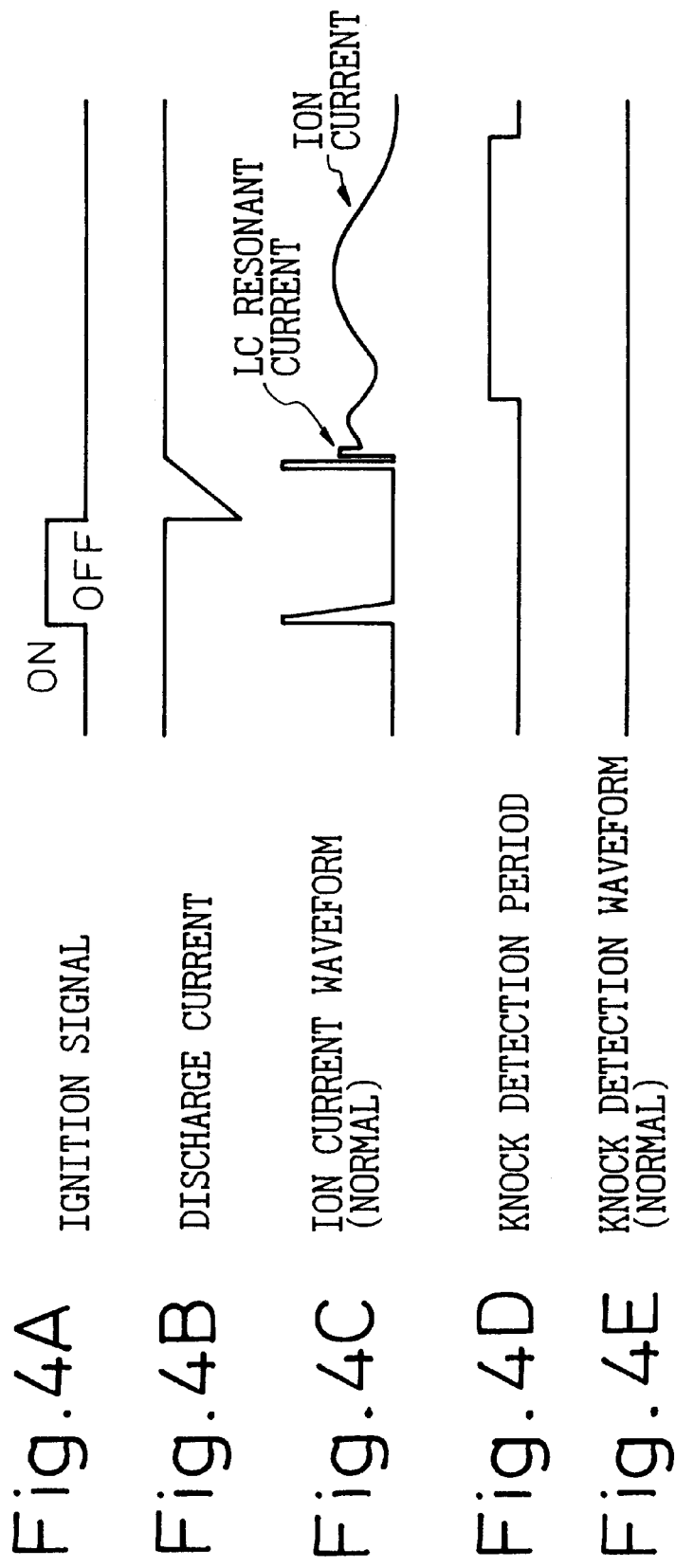

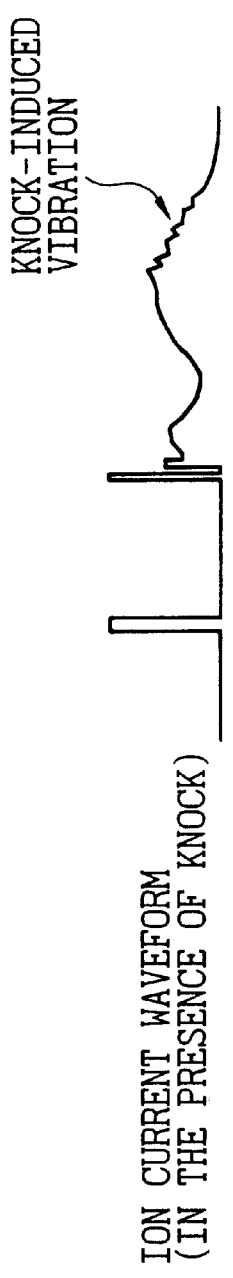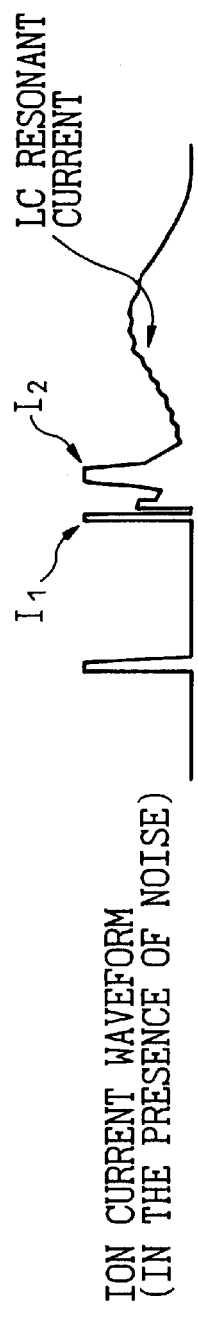
Fig. 4F  ION CURRENT WAVEFORM (IN THE PRESENCE OF KNOCK)
Fig. 4G  KNOCK DETECTION WAVEFORM (IN THE PRESENCE OF KNOCK)
Fig. 4H  ION CURRENT WAVEFORM (IN THE PRESENCE OF NOISE)
Fig. 4I  KNOCK DETECTION WAVEFORM (IN THE PRESENCE OF NOISE)

KNOCK DETECTING DEVICE FOR INTERNAL COMBUSTION ENGINE

BACKGROUND OF THE INVENTION

1. Field of the Invention

The present invention relates to a knock detection device for an internal combustion engine and, more particularly, to a device for detecting knock based on an ion current inside an combustion chamber.

2. Description of the Related Art

In a gasoline engine, the air/fuel mixture in the vicinity of a spark plug is ignited by the spark produced at the spark plug, and gasoline combustion takes place with the ignited flame propagating throughout the entire air/fuel mixture. Knocking is one kind of abnormal combustion. It is a phenomenon in which the air/fuel mixture self-ignites before the flame front arrives when there occurs an abnormally rapid rise in pressure during flame propagation. When knock occurs, combustion gases oscillate, which allows heat to propagate more freely, and in some cases, engine damage may result. Knocking is closely related to ignition timing; as the ignition timing is advanced, maximum combustion compression increases, increasing the tendency to knock.

On the other hand, it is desirable to increase the compression ratio in order to increase thermal efficiency and reduce fuel consumption. To achieve this, it is practiced, as part of ignition timing control, to advance the ignition timing up to the limit where knock is about to occur by detecting the occurrence of knock. Previously, in this kind of knock detection method, it was common practice to detect knock-induced vibrations using a vibration sensor attached to the cylinder block or like part, but in recent years, a knock detection method has been proposed that utilizes the change of an ion current inside a cylinder when knock occurs.

More specifically, when a spark is produced at the spark plug and air/fuel mixture burns in the combustion chamber, the air/fuel mixture is ionized. When the mixture is in the ionized state, if a voltage is applied to the spark plug, an ion current flows. The occurrence of knock can be detected by detecting and analyzing this ion current. Usually, when knock occurs, an oscillating component of 6 kHz to 7 kHz appears in the ion current. The knock detection device based on the ion current extracts this frequency component peculiar to knock by means of a filter, and judges the knocking condition based on the magnitude of that component.

As an example, Japanese Unexamined Patent Publication No. 61-57830 discloses a device which detects knock by extracting a particular frequency component associated with knock from an ion current signal. The construction of this device is such that a capacitor as an ion current generating source is charged to a given voltage by the secondary current produced when the primary current of the ignition coil is shut off and, after spark discharge, the ion current is measured that flows through a closed circuit consisting of the capacitor, the secondary winding of the ignition coil, the spark plug, and a current detecting resistor.

However, when the secondary winding of the ignition coil (the secondary coil) is placed in the ion current flow path, as in the above prior art, an LC resonant circuit is formed by its inductance L and the stray capacitance C associated with the coil and spark plug. As a result, when rapid changes occur in the ion current, LC resonance occurs within the ion current path and a resonant current flows.

The resonance frequency of such a resonant current is determined by the values of the inductance L and capacitance C within the ion current path. If this resonance frequency is close to the knock-induced frequency, a situation can occur where the frequency component for knock detection appears in the ion current despite nonoccurrence of knock. In that case, an erroneous decision is made that knock has occurred when actually knock has not occurred.

SUMMARY OF THE INVENTION

In view of this situation, it is an object of the present invention to provide a knock detection device capable of preventing an erroneous decision from being made due to the LC resonant current in the ion current path.

To achieve the above object, according to a first aspect of the present invention, there is provided a knock detection device for an internal combustion engine, comprising: an ignition coil; switching means, connected to the primary of the ignition coil, for switching primary current on and off; a spark plug, connected to the secondary of the ignition coil, for igniting an air/fuel mixture in a cylinder by a high voltage induced in the ignition coil secondary when the primary current is shut off by the switching means; ion current detection means, forming an ion current path together with the ignition coil secondary and the spark plug, for applying a voltage to the spark plug and for detecting an ion current that flows through the spark plug and through ions generated in the cylinder when the air/fuel mixture burns; and processing means for determining the presence or absence of knock by extracting a frequency component peculiar to knock from an output signal of the ion current detection means; wherein an LC resonance frequency, which is determined by the inductance of the ignition coil secondary and a stray capacitance formed in the ion current path, is set so as not to coincide with the frequency component peculiar to the knock.

According to a second aspect of the present invention, in the knock detection device according to the first aspect, the LC resonance frequency is set to a value lower than the frequency peculiar to the knock by setting the inductance of the ignition coil secondary winding to a large value.

According to a third aspect of the present invention, in the knock detection device according to the first or second aspect, the LC resonance frequency is set to a value lower than the lower cut-off frequency of a band-pass filter provided in the processing means.

In the knock detection device for an internal combustion engine constructed in accordance with the first aspect of the present invention, since the LC resonance frequency that causes noise is displaced from the frequency peculiar to knock, only the frequency component induced by the knock can be detected accurately from the ion current output, thus preventing an erroneous decision to be made, due to the LC resonant current, that knock has occurred. Further, in the knock detection device for an internal combustion engine constructed in accordance with the second aspect of the present invention, since the LC resonance frequency is displaced by increasing the inductance of the ignition coil secondary winding, duration of the spark at the spark plug is increased, which serves to improve ignitability as well as knock detectability. Moreover, in the knock detection device for an internal combustion engine constructed in accordance with the third aspect of the present invention, the LC resonance frequency component that causes noise can be eliminated more reliably when extracting the frequency component induced by knock.

BRIEF DESCRIPTION OF THE DRAWINGS

Further features and advantages of the present invention will be apparent from the following description with reference to the accompanying drawings, in which:

FIGS. 4A, 4B, 4C, 4D, 4E, 4F, 4G, 4H, and 4I are waveform diagrams for explaining a method of knock detection processing based on the ion current;

DESCRIPTION OF THE PREFERRED EMBODIMENTS

The preferred embodiments of the present invention will be described below with reference to the accompanying drawings.

Figure 1:
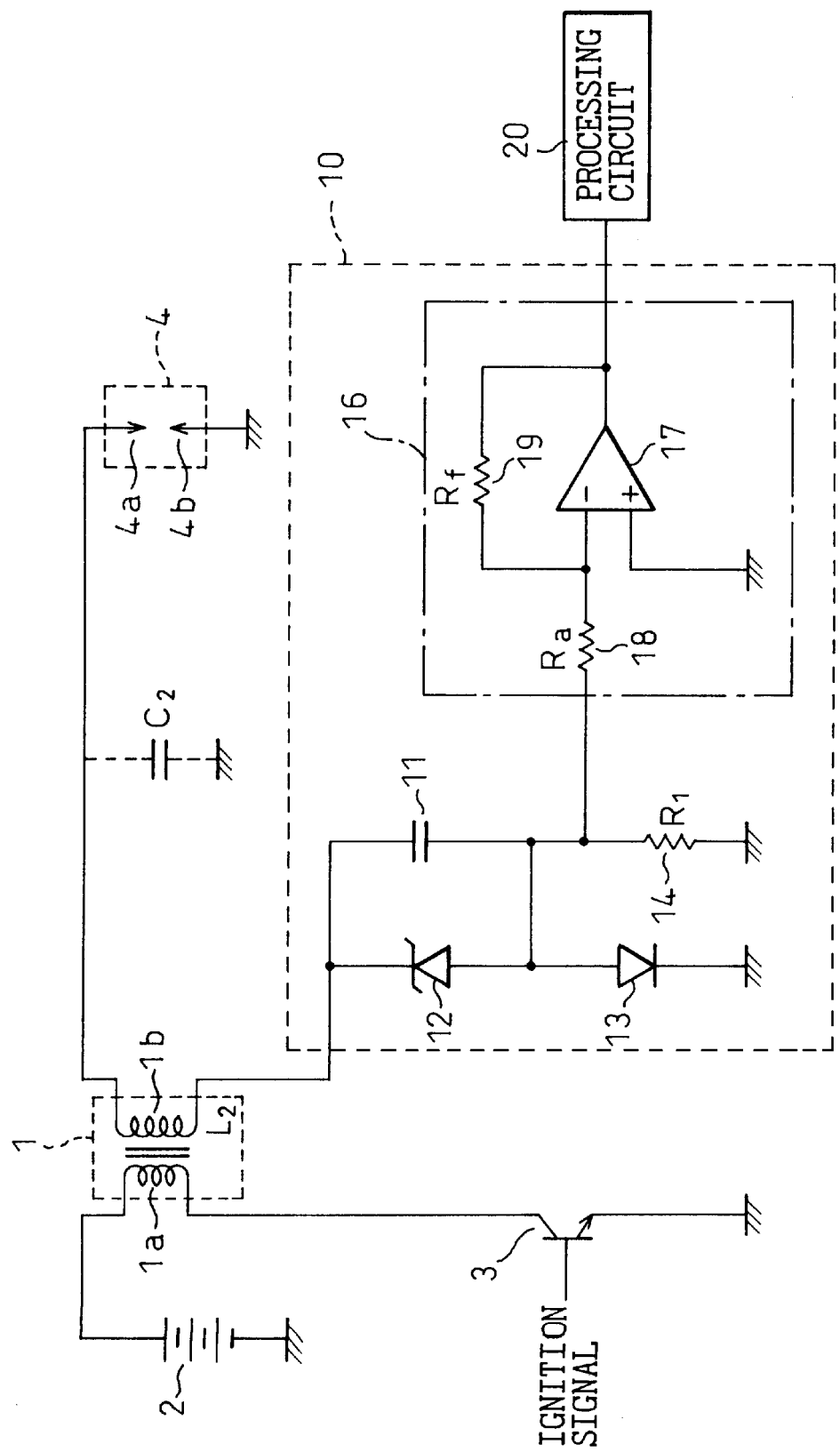
FIG. 1 is a diagram showing the circuit configuration of a knock detection device according to one embodiment of the present invention.

FIG. 1 is a diagram showing the circuit configuration of a knock detection device according to one embodiment of the present invention. One end of the primary winding 1a of an ignition coil 1 is connected to the positive electrode of a battery 2, and the other end is connected to the collector of a transistor 3 as switching means. The emitter of the transistor 3 is grounded, and an ignition signal is applied to its base. One end of the secondary winding 1b of the ignition coil 1 is connected to the center electrode 4a of a spark plug 4. The outer electrode 4b of the spark plug 4 is grounded.

An ion current detection circuit 10 is provided at the other end of the secondary winding 1b of the ignition coil 1. First, a capacitor 11 as an ion current generating source is connected to the secondary winding 1b. Connected in parallel with this capacitor 11 is a voltage-regulator diode (Zener diode) 12 which limits the voltage supplied to the capacitor 11, for charging by the ignition coil secondary current, to a specified value. The other end of the capacitor 11 is grounded via a diode 13 that passes current only to ground, and is also grounded via an ion current detecting resistor 14.

Then, the node between the capacitor 11 and the ion current detecting resistor 14 is connected to an inverting amplifier circuit 16. The inverting amplifier circuit 16 consists of an operational amplifier 17 whose noninverting input terminal (+terminal) is grounded, an input resistor 18 which is connected to the inverting input terminal (−terminal) of the operational amplifier 17, and a feedback resistor 19 directed from the output terminal to the inverting input terminal (−terminal) of the operational amplifier 17. When the resistance value of the input terminal 18 is $R_a$ and that of the feedback resistor 19 is $R_f$, a voltage amplification gain of $-R_f/R_a$ is obtained, as is well known. The output of the inverting amplifier circuit 16 is directed to a processing circuit 20 which performs signal processing for knock determination. Here, $R_a$ and $R_f$ are very large values compared with the resistance value $R_I$ of the ion current detecting resistor 14.

Figure 2:
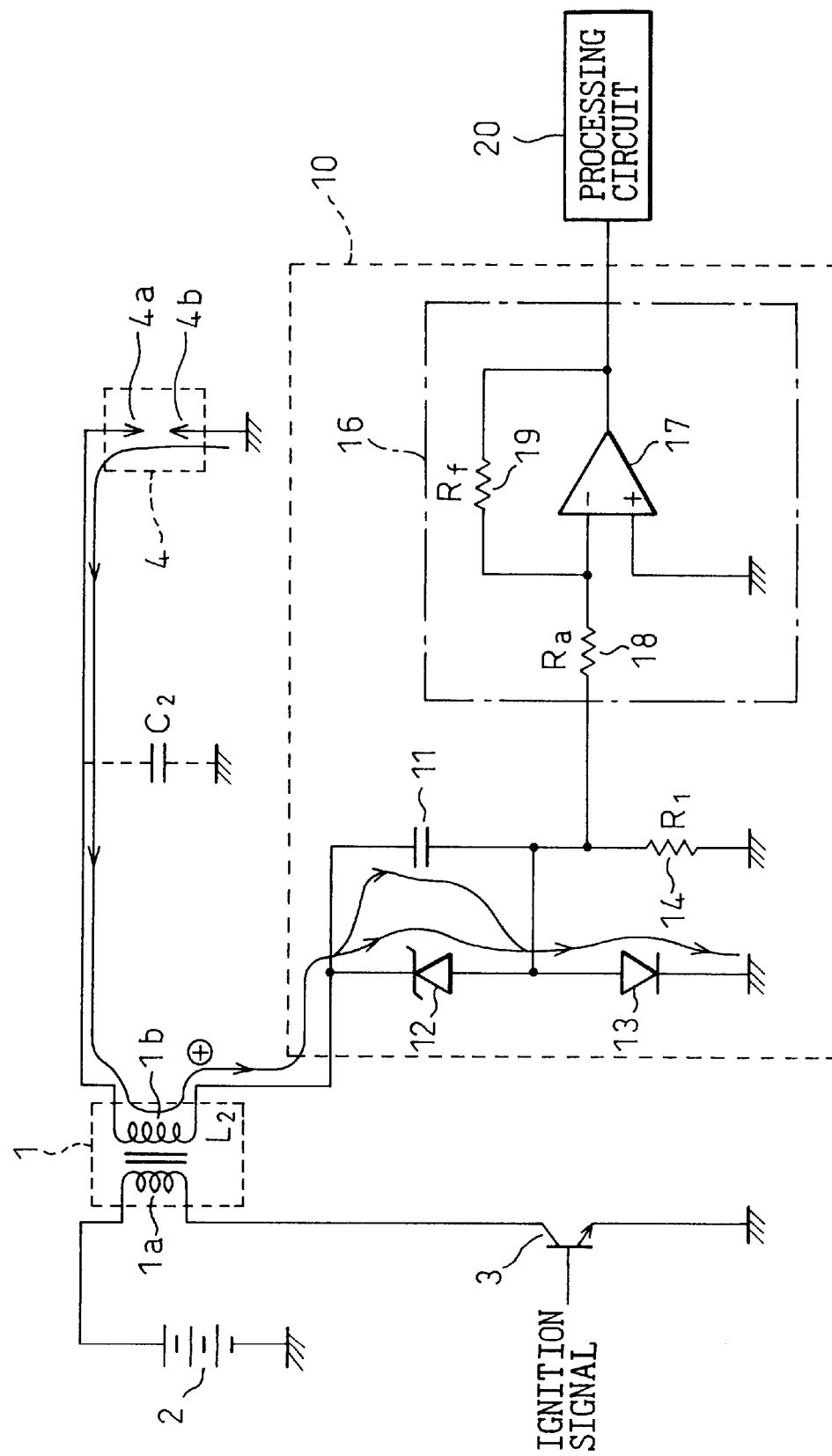
FIG. 2 is a diagram for explaining the flow of a discharge current when a spark discharge occurs at a spark plug.

Next, the operation of the ion current detection circuit 10 will be described. First, when the ignition signal goes high, the transistor 3 is turned on and current flows through the primary winding 1a of the ignition coil. Next, when the ignition signal is set low, the transistor 3 is turned off and the primary current is thus shut off. This induces a high voltage in the secondary winding 1b of the ignition coil 1, and a spark discharge occurs at the spark plug 4. That is, when a high negative voltage is applied to the center electrode 4a of the spark plug 4, an electric arc or spark is produced between the center electrode 4a and the outer electrode (ground electrode) 4b, and a current flows from the secondary winding 1b of the ignition coil and back to the secondary winding 1b through the capacitor 11, the voltage-regulator diode 12, the diode 13, and the spark plug 4, as shown in FIG. 2. During this process, the capacitor 11 is charged to a voltage equal to the Zener voltage (about 100 volts) of the voltage-regulator diode 12.

Figure 3:
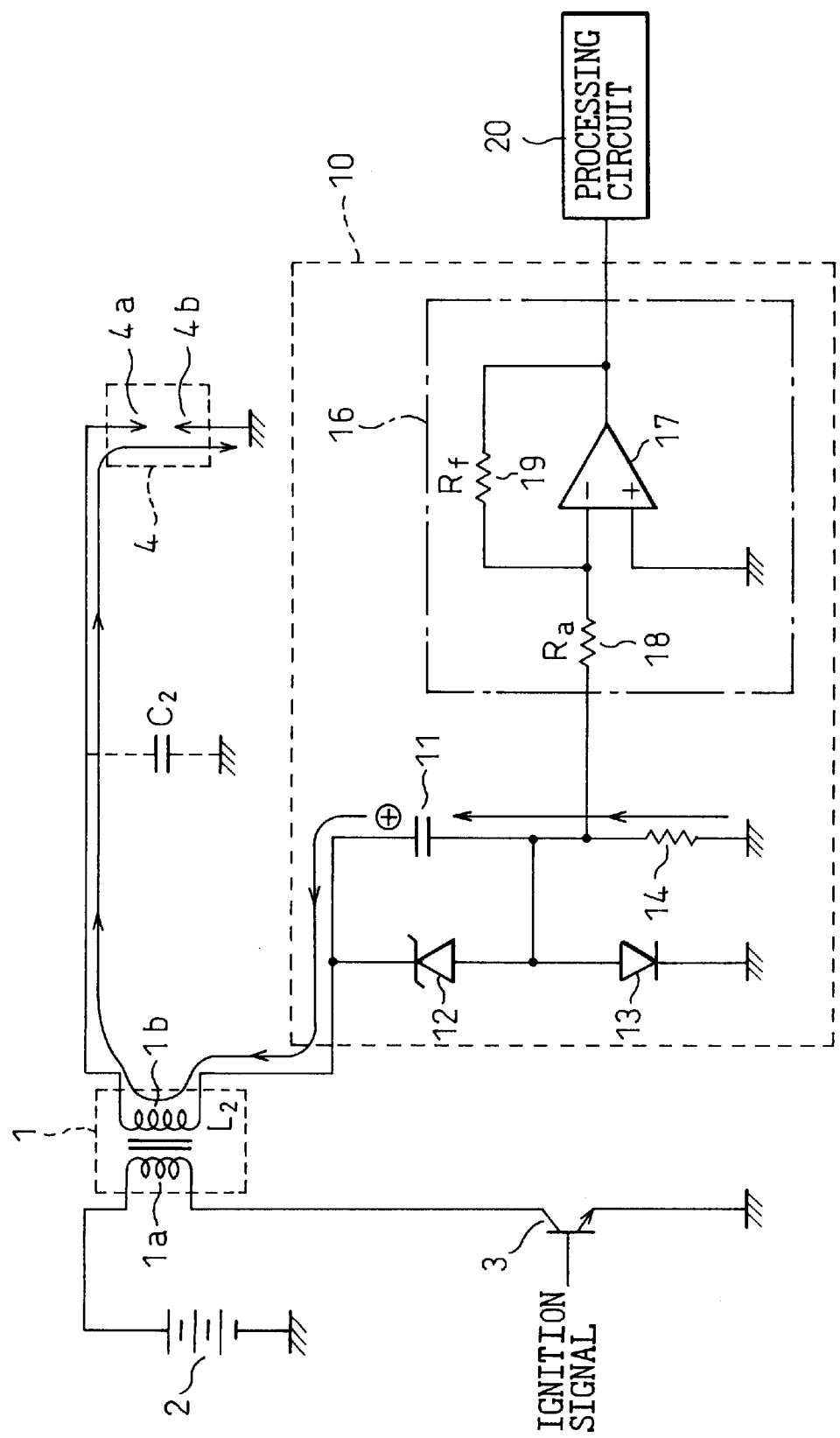
FIG. 3 is a diagram for explaining the flow of an ion current after the spark discharge.

When the air/fuel mixture inside the combustion chamber is burned by being ignited by the spark at the spark plug 4, the air/fuel mixture is ionized. When the mixture is in the ionized state, conductivity is retained across the gap between the two electrodes of the spark plug 4. Furthermore, since a voltage is applied between the two electrodes of the spark plug 4 by the charged voltage of the capacitor 11, an ion current flows. This ion current flows from one end of the capacitor 11 and is routed through the ignition coil secondary winding 1b, the spark plug 4, and the ion current detecting resistor 14 to the other end of the capacitor 11, as shown in FIG. 3. Then a voltage equal to −(ion current value)×detecting resistor value appears at the node between the ion current detecting resistor 14 and the capacitor 11, and this voltage is inverted and amplified by the inverting amplifier circuit 16. Finally, the output of the inverting amplifier circuit 16 is supplied as the ion current output to the processing circuit 20.

FIGS. 4A, 4B, 4C, 4D, 4E, 4F, 4G, 4H, and 4I are diagrams for explaining a method of knock detection processing based on the ion current. As shown in FIGS. 4A and 4B, at the instant the ignition signal is turned off, a spark discharge occurs at the ignition plug 4 and a discharge current flows. Then, at the end of the spark discharge, the ignition coil attempts to discharge residual magnetic energy, as a result of which LC resonance occurs between the inductance $L_2$ of the ignition coil secondary winding 1b and the stray capacitance $C_2$ (see FIG. 1) formed in the high voltage line, and an LC resonant current flows. Since this LC resonant current is detected by the ion current detecting resistor, an abrupt change appears in the ion current waveform at the end of the spark, as shown in FIG. 4C, but this change is not due to the ion current. After the LC resonant current due to the residual magnetic energy flows, the ion current flows as shown in FIG. 4C.

In the processing circuit 20 shown in FIG. 1, a knock detection period is provided in such a manner as to avoid the LC resonant current due to the residual magnetic energy, as shown in FIG. 4D, and only the ion current output signal, during this period, is passed through a band-pass filter to extract only the frequency component peculiar to knock (hereinafter called the knock frequency). When knock does not occur, a knock signal does not appear in the band-bass filtered waveform (hereinafter called the knock detection waveform), as shown in FIG. 4E.

On the other hand, when knock has occurred, a high-frequency oscillating component peculiar to the knock appears in the ion current waveform, as shown in FIG. 4F. In this case, the high-frequency component appears in the band-pass filtered knock detection waveform, as shown in FIG. 4G.

Further, in some cases a situation may occur where, after the abrupt LC resonant current $I_1$ has passed, due to the ignition coil residual magnetic energy, a greatly varying ion current $I_2$ flows through the ignition coil, triggering the occurrence of a very small LC resonance, and this very small LC resonance current is superimposed as noise on the ion current signal, as shown in FIG. 4H. If this LC resonance frequency is close to the knock frequency, a signal indicating knock had occurred will appear in the knock detection waveform, as shown in FIG. 4I.

In many cases, the LC resonance frequency of the ignition system happens to be close to the knock frequency; to avoid such a situation, the ignition system must be deliberately designed so that the LC resonance frequency does not coincide with the knock frequency, that is, the LC resonance frequency is somewhat separated from the knock frequency.

When we consider the spark plug, a longer spark duration produces a better result when igniting the air/fuel mixture by spark. For that purpose, either the amount of spark current or the secondary inductance $L_2$ must be increased, but in practice values of $L_2$ around 10 to 15 H should provide a good balance from the standpoint of reliability and rating. The stray capacitance $C_2$ is about 50 pF. Hence, the LC resonance frequency $f_{LC}$ is $$f_{LC} = 1/2\pi\sqrt{L_2 C_2} = 5.8 \text{ kHz} - 7.1 \text{ kHz}$$

On the other hand, the knock frequency $f_0$ is determined by the cylinder bore, and is about 6 kHz to 7 kHz which is approximately equal to the LC resonance frequency $f_{LC}$.

From the above, if the LC resonance frequency $f_{LC}$ is to be separated from the knock frequency $f_0$ while maintaining ignitability, it is desirable to increase the secondary inductance L2 and set $L_2$ and $C_2$ of the ignition system so that $f_{LC} < f_0$.

Figure 5:
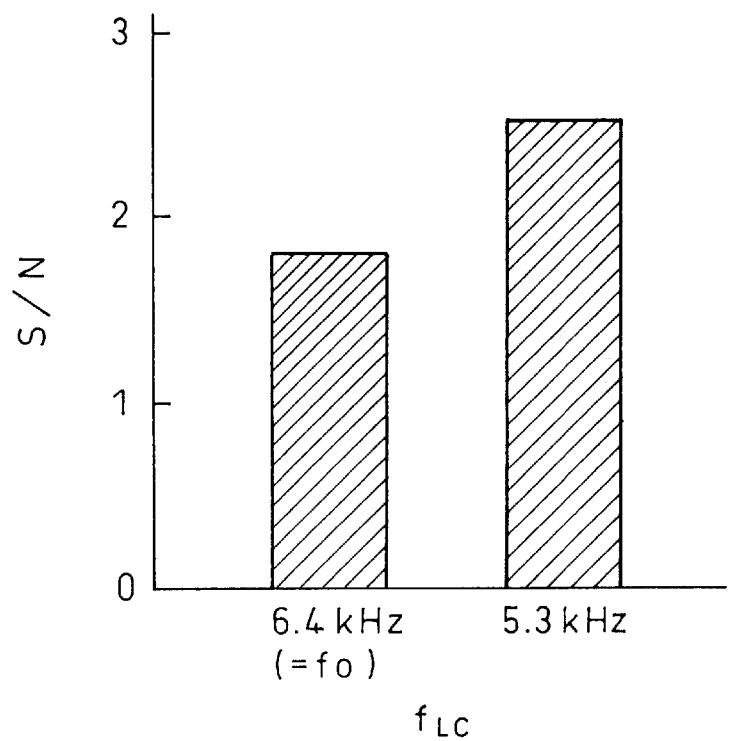
FIG. 5 is a characteristic diagram illustrating an example of the relationship between LC resonance frequency and knock detectability.

FIG. 5 is a characteristic diagram illustrating, as an example, the result of an experiment showing how the knock detectability is affected when the LC resonance frequency $f_{LC}$ is changed. In that experiment, an engine with a knock frequency $f_0$ of 6.4 kHz was used, and a band-pass filter with a center frequency of 6.4 kHz and a Q value (quality factor) of 20 was used as the band-pass filter (BPF) for extracting the knock frequency component. The characteristic diagram shows how a signal-to-noise ratio S/N (plotted along the ordinate) changes between two values of the LC resonance frequency $f_{LC}$ (plotted along the abscissa), i.e., 6.4 kHz and 5.3 kHz. Here, S/N represents the ratio of knock-affected BPF output S to knock-free BPF output N, and of course, as S/N increases, the knock detectability improves and the probability of erroneous decision decreases.

As can be seen from the diagram, S/N improves when $f_{LC}$=5.3 kHz, that is, when the LC resonance frequency is displaced from the knock frequency, as compared with the case when $f_{LC}$=6.4 kHz (=$f_0$), that is, when the LC resonance frequency coincides with the knock frequency.

Figure 6:
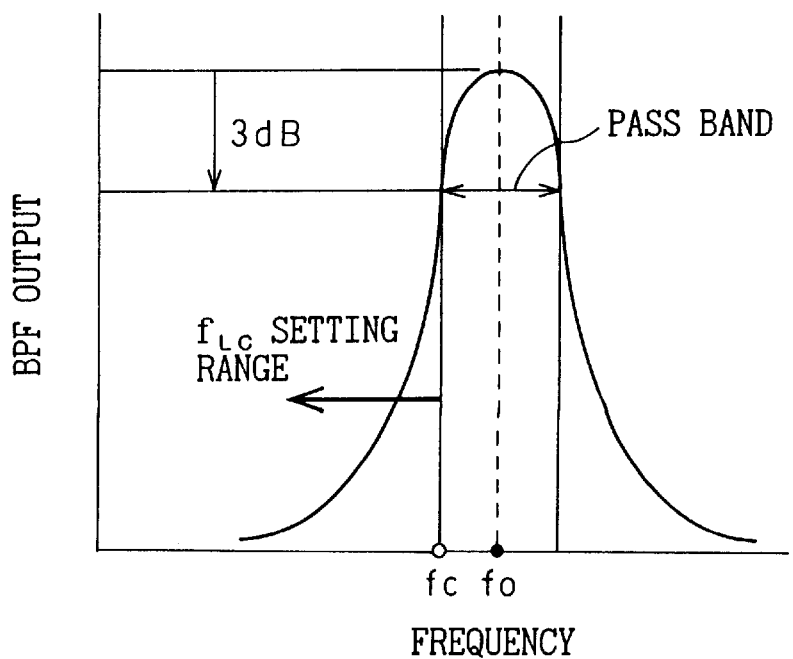
FIG. 6 is a diagram showing the frequency characteristic of a band-pass filter (BPF) output.

FIG. 6 is a diagram showing the frequency characteristic of the band-pass filter (BPF) output. Usually, the center frequency $f_0$ of the BPF is chosen to coincide with the knock frequency $f_0$, but the BPF provides a certain degree of output for frequencies around the center frequency. The frequency range up to the point at which the output is 3 dB below the peak output (that is, $1/\sqrt{2}$ of the peak output) is called the bandwidth (pass band), and the frequencies at which the output is 3 dB below the peak output are called the cut-off frequencies which consist of an upper cut-off frequency band and a lower cut-off frequency band.

Since the BPF output is significantly attenuated for frequencies outside the pass band, the LC resonance noise can be eliminated more reliably by setting the LC resonance frequency $f_{LC}$ lower than the lower cut-off frequency $f_c$. More specifically, since $$Q=20 \log_{10}\{f_0/(f_0-f_c)\}$$

$L_2$ and $C_2$ should be set so as to satisfy $$f_{LC} = 1/2\pi\sqrt{L_2 C_2} < f_c = f_0/(1+10^{-Q/20})$$

As an example, when Q=20 and $f_0$=6.4 kHz, $L_2$ and $C_2$ are set so that $f_{LC}$<5.8 kHz.

As described above, according to the first aspect of the present invention, since the LC resonance frequency that causes noise is set so as not to coincide with the frequency peculiar to knock, only the frequency component induced by the knock can be detected accurately from the ion current output, thus preventing an erroneous knock decision from being made because of the LC resonant current. Furthermore, according to the second aspect of the present invention, since the inductance of the ignition coil secondary is set large in addition to displacing the LC resonance frequency, the duration of the spark at the spark plug is increased, which serves to improve ignitability as well as knock detectability. Moreover, according to the third aspect of the present invention, the LC resonance frequency component that causes noise can be eliminated more reliably when extracting the knock-induced frequency component.

The invention may be embodied in other specific forms without departing from the spirt or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A knock detection device for an internal combustion engine, comprising:

an ignition coil;

switching means connected to the primary of the ignition coil for switching a primary current on and off;

a spark plug connected to the secondary of said ignition coil for igniting an air/fuel mixture in a cylinder by a high voltage induced in the ignition coil secondary when the primary current is shut off by the switching means;

ion current detection means which, together with the ignition coil secondary and the spark plug, forms an ion current path, the ion current detection means detecting an ion current that flows through the spark plug due to ions generated in the cylinder when the air/fuel mixture burns; and processing means for determining the presence or absence of knock by extracting from a signal output from the ion current detection means a knocking frequency component peculiar to knocking;

wherein an LC resonance frequency, determined based on an inductance of the ignition coil secondary and a stray capacitance formed in the ion current path, is set so as not to coincide with the knocking frequency component and wherein the LC resonance frequency is set to a value lower than the knocking frequency component by setting the inductance of the ignition coil secondary to a large value.

2. A device for an internal combustion engine, comprising:

an ignition coil;

switching means connected to the primary of the ignition coil for switching a primary current on and off;

a spark plug connected to the secondary of said ignition coil for igniting an air/fuel mixture in a cylinder by a high voltage induced in the ignition coil secondary when the primary current is shut off by the switching means;

ion current detection means which, together with the ignition coil secondary and the spark plug, forms an ion current path, the ion current diction means detecting an ion current that flows through the spark plus due to ions generated in the cylinder when the air/fuel mixture burns; and processing means for determining the presence or absence of knock by extracting from a signal output from the ion current detection means a knocking frequency component peculiar to knocking, the processing means including a band-pass filter;

wherein an LC resonance frequency, determined based on an inductance of the ignition coil secondary and a stray capacitance formed in the ion current path, is set so as not to coincide with the knocking frequency component and wherein the LC resonance frequency is set to a value lower than a lower cut-off frequency of the band-pass filter.

* * * * *